(12) United States Patent
Brambilla et al.

(10) Patent No.: US 9,822,199 B2
(45) Date of Patent: Nov. 21, 2017

(54) METALLOCENE CATALYST BASED ON A TRANSITION METAL OF GROUPS 4 OR 5 OF THE PERIODIC TABLE IMMOBILIZED ON A SUPPORT MODIFIED WITH SOLUBLE HYBRID SILICA, METHOD FOR PRODUCING AND USING SAME

(71) Applicant: Braskem S.A., Camacari, BA (BR)

(72) Inventors: Rodrigo Brambilla, Sao Paulo (BR); Marcia Silva Lacerda Miranda, Sao Paulo (BR); Ana Cristina Fontes Moreira, Sao Paulo (BR); Etienne Marcos de Almeida Rocha, Sao Paulo (BR); Maria Angelica Cardoso Gollmann, Sao Paulo (BR)

(73) Assignee: Braskem S.A., Camacari, BA (BR)

(*) Notice: Subject to any disclaimer, the term of this patent is extended or adjusted under 35 U.S.C. 154(b) by 0 days.

(21) Appl. No.: 15/101,710

(22) PCT Filed: Dec. 4, 2014

(86) PCT No.: PCT/BR2014/050029
§ 371 (c)(1),
(2) Date: Sep. 19, 2016

(87) PCT Pub. No.: WO2015/081409
PCT Pub. Date: Jun. 11, 2015

(65) Prior Publication Data
US 2017/0107316 A1 Apr. 20, 2017

Related U.S. Application Data

(60) Provisional application No. 61/912,355, filed on Dec. 5, 2013.

(51) Int. Cl.
*C08F 4/02* (2006.01)
*C08F 4/6592* (2006.01)
*C08F 210/02* (2006.01)
*C08F 210/16* (2006.01)

(52) U.S. Cl.
CPC .............. *C08F 210/16* (2013.01); *C08F 4/02* (2013.01); *C08F 4/6592* (2013.01); *C08F 210/02* (2013.01)

(58) Field of Classification Search
CPC .... C08F 4/02; C08F 4/65912; C08F 4/65916; C08F 210/02
See application file for complete search history.

(56) References Cited

U.S. PATENT DOCUMENTS

| | | |
|---|---|---|
| 4,808,561 A | 2/1989 | Welborn, Jr. |
| 5,057,475 A | 10/1991 | Canich et al. |
| 5,466,649 A | 11/1995 | Jejelowo |
| 5,968,864 A | 10/1999 | Shamshoum et al. |
| 6,239,058 B1 | 5/2001 | Shamshoum et al. |
| 6,403,732 B2 | 6/2002 | Marks et al. |
| 6,605,560 B1 | 8/2003 | Chang |
| 6,908,876 B2 | 6/2005 | Atiqullah et al. |
| 7,452,947 B2 | 11/2008 | Cramail et al. |
| 2011/0230630 A1 | 9/2011 | Sell et al. |

FOREIGN PATENT DOCUMENTS

| | | |
|---|---|---|
| EP | 0628574 A1 | 12/1994 |
| EP | 1234837 A1 | 8/2002 |
| EP | 1412420 B1 | 3/2011 |

*Primary Examiner* — Caixia Lu
(74) *Attorney, Agent, or Firm* — Duane Morris LLP

(57) ABSTRACT

The present invention pertains to a metallocene catalyst based on a transition metal of groups 4 or 5 of the periodic table prepared by the immobilization of a metallocene complex on a support modified with hybrid soluble silica, prepared by a non-hydrolytic sol-gel process. There is also described a process for preparing said catalyst.

Figure 1:
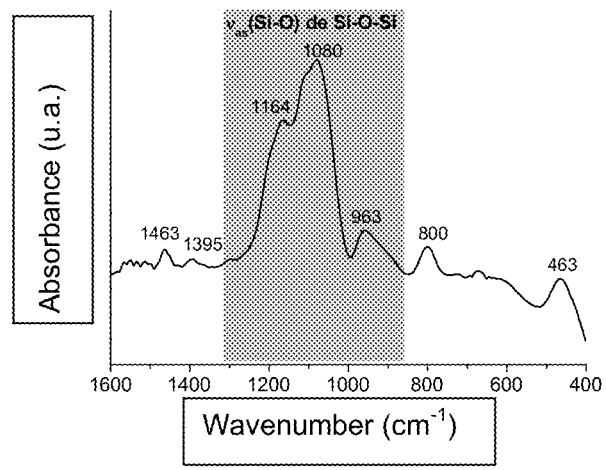

The supported metallocene catalyst of the present invention has the advantages of high catalytic activity, morphology, besides the fact of producing copolymers of ethylene with alpha-olefins having molecular behavior that will bring benefits in mechanical properties, such as resistance to tearing, piercing and impact, as well as improved optical and weldability properties.

20 Claims, 3 Drawing Sheets

(a)　　　　　　　　　(b)

METALLOCENE CATALYST BASED ON A TRANSITION METAL OF GROUPS 4 OR 5 OF THE PERIODIC TABLE IMMOBILIZED ON A SUPPORT MODIFIED WITH SOLUBLE HYBRID SILICA, METHOD FOR PRODUCING AND USING SAME

TECHNICAL FIELD

The present invention pertains to a catalyst prepared by the immobilization of metallocene complex on a support modified with hybrid soluble silica, prepared by a non-hydrolytic sol-gel process. A process for preparing said catalyst is also described.

DESCRIPTION OF THE STATE OF THE ART

The benefits of the polyethylenes produced using metallocene catalyst are well known in the state of the art and have been commercialized for film producers since 1991 in the world. Currently, there is a quantity of well-established families of polyethylene produced with metallocenes and new polymers are constantly being introduced onto the market. Each family is made using a different combination of catalyst/reactor and each of these produces a single set of polymer properties.

The mPEBDL (Linear Low Density Polyethylene obtained with metallocenes) polymers can be typically produced in gas phase reactors, among others, and their properties enable them to be used in special films, industrial sacks and flexible packaging for foods. Two specific examples of application for mPEBDL are plastic stretch packaging for frozen food and plastic shrink wrap for wrapping primary packages such as bottles or cans, widely used in Brazil. [CEH Linear Low Density Polyethylene LLDPE Resins 2011—SRI Consulting]

To use metallocenes at industrial plants for polymerization of ethylene that operate with gas phase processes, these catalysts must be heterogeneized by immobilization thereof on solid supports. Among the different supports already described in the state of the art, silica is by far the one used most.

The routes for immobilization of metallocenes on the surface of the silica described in the state of the art can be divided, mostly, into three large groups: (i) direct immobilization (See, for example, Dos Santos et al, Macromol. Chem. Phys. 198 (1997) 3529; Dos Santos et al, J. Mol. Catal A; 139 (1999) 199; Dos Santos et al, Macromol. Chem. Phys. 200 (1999) 751); (b) immobilization on silica modified with metylaluminoxane or with other cocatalysts; (See, for example, U.S. Pat. No. 6,239,058, U.S. Pat. No. 4,808,561, U.S. Pat. No. 5,057,475, U.S. Pat. No. 5,466,649, U.S. Pat. No. 5,968,864, U.S. Pat. No. 6,605,560, U.S. Pat. No. 236,365, EP1234837, EP1412420) and (c) immobilization on silica modified with organoborans (See, for example, EP 628574, U.S. Pat. No. 6,403,732, U.S. Pat. No. 6,908,876, US20110230630).

Generally, the supported metallocene catalysts for use in a gas phase process result in copolymers of ethylene and α-olefins with inferior properties to those noted for copolymers obtained by using homogenous complexes, such as, for example, those of the constrained geometry catalyst (CGC) type, in processes in solution. Therefore, it is considered a technological challenge, in light of the state of the art, to develop a supported metallocene catalyst, for a gas phase process, that produces mPEBDL with uniform distribution of comonomer in the polymer chains.

U.S. Pat. No. 7,452,947B2 teaches the preparation of supported metallocene catalysts by a non-hydrolytic sol-gel process. In the preparation protocol used, a hybrid silica is synthesized by condensing an organosilane containing anionic ligands, a halogenated silane and an alkoxysilane. The hybrid silica generated is subsequently subjected to a metallation reaction and the resulting catalyst is active, in the presence of a cocatalyst, in the polymerization of olefins. However, the proposed route does not enable the formation of a hybrid soluble silica in hydrocarbons and, consequently, the morphological control of the supported catalyst. Moreover, the polymers obtained do not display a uniform distribution of the incorporated comonomer.

As can be observed in the art, it is neither described nor expected that the immobilization of a metallocene on a support modified with a hybrid silica endowed with aliphatic groups will result in a catalyst that combines the following characteristics: high catalytic activity, suitable morphology for industrial process and capacity to produce copolymers with homogenous distribution of comonomer.

OBJECTIVES OF THE INVENTION

The present invention provides a metallocene catalyst based on a transition metal of groups 4 or 5 of the periodic table immobilized on a support modified with hybrid soluble silica, comprising (I)—at least one metallocene derived from a compound of formula 1:

$$[L]_2\text{-}MQ_2 \qquad \text{formula 1}$$

wherein,

M is a transition metal of groups 4 or 5;

Q, which may be the same or different, comprises: halogen radical, aryl radical, alkyl radical containing from 1 to 5 carbon atoms or alkoxy radical containing from 1 to 5 carbon atoms; and L is a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by bonding.

(II)—a hybrid soluble silica;

(III)—an inorganic catalyst support;

(IV)—at least one aluminum-containing organometallic reagent.

There is also described a process of obtaining a supported metallocene catalyst comprising the following steps:

a. Preparing a hybrid soluble silica;

b. Reacting a hybrid soluble silica obtained in step (a) with an inorganic support;

c. Removing the solvent from the reaction product obtained in step (b);

d. Reacting the product obtained in step (c) with an organometallic reagent containing aluminum;

e. Removing the solvent from the reaction product obtained in step (d);

f. Reacting the product obtained in step (e) with a metallocene complex;

g. Removing the solvent from the reaction product obtained in step (f).

Lastly, the present invention also pertains to the use of the supported metallocene catalyst used in process of copolymerization of ethylene with alpha-olefins, resulting in polymers with uniform distribution of incorporated comonomer and with high molar mass value in the ultra-high molar mass fraction (Mz).

The supported metallocene catalyst of the present invention has advantages over the state of the art such as high catalytic activity, morphology, besides the fact of producing copolymers of ethylene with alpha-olefins having molecular behavior that will bring benefits in mechanical properties, such as resistance to tearing, piercing and impact, as well as improved optical and weldability properties.

SUMMARIZED DESCRIPTION OF THE DRAWINGS

The present invention will next be described in greater detail based on examples of execution represented in the drawings. The drawings show:

FIG. 1—Infrared spectrum of the hybrid soluble silica obtained in Example 1.

Figure 2:
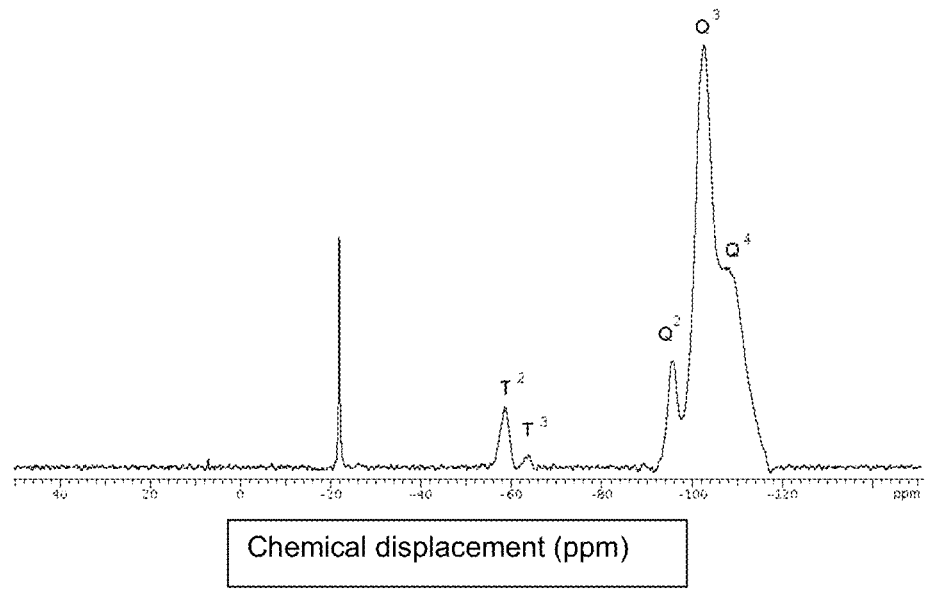

FIG. 2—Nuclear magnetic resonance spectrum of $^{29}$Si of the hybrid soluble silica obtained in Example 1.

Figure 3:
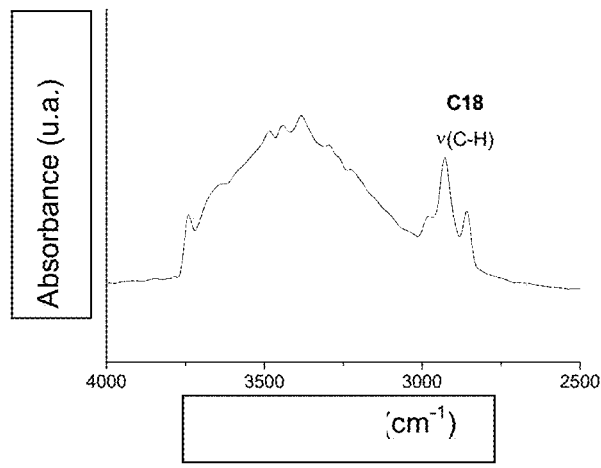

FIG. 3—Infrared spectrum of the support modified obtained in Example 2.

Figure 4:
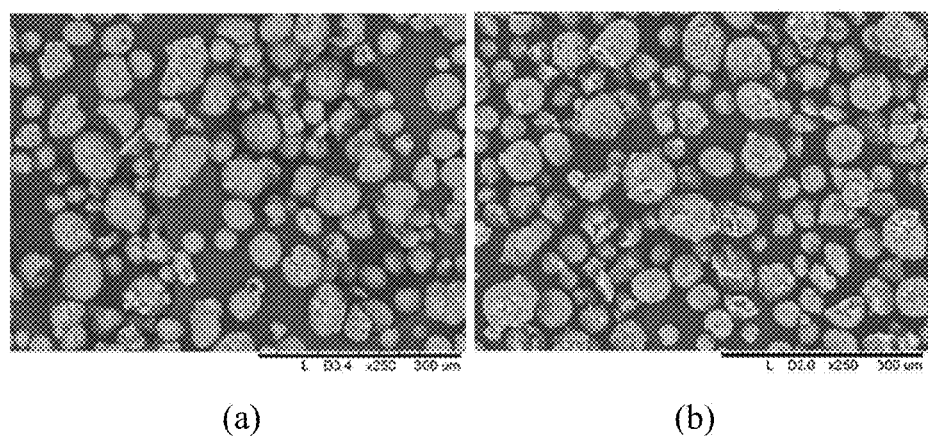

FIG. 4—Scanning electron microscopy images of the inorganic support and of the support modified with hybrid soluble silica, obtained in Example 2.

Figure 5:
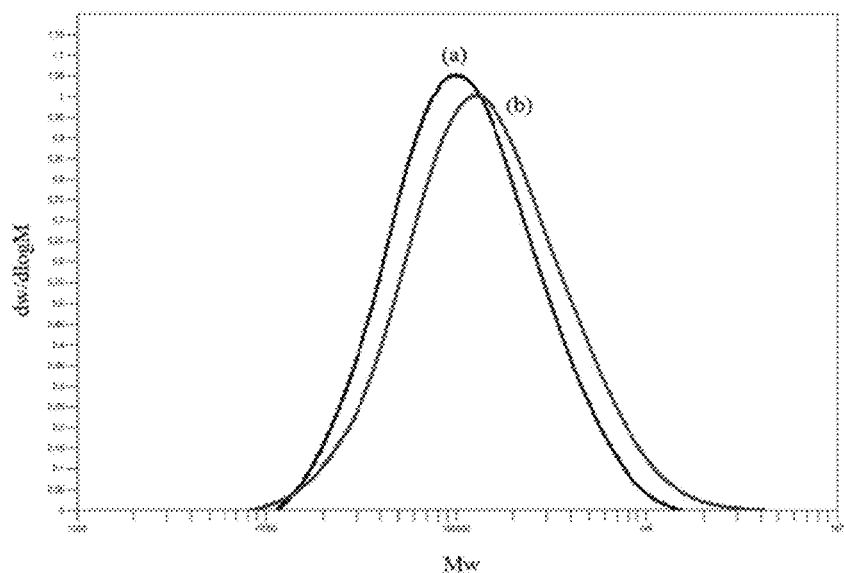

FIG. 5—Gel permeation chromatograms for linear low-density polyethylenes prepared with the catalysts from Examples 3 and 4 (Comparative).

Figure 6:
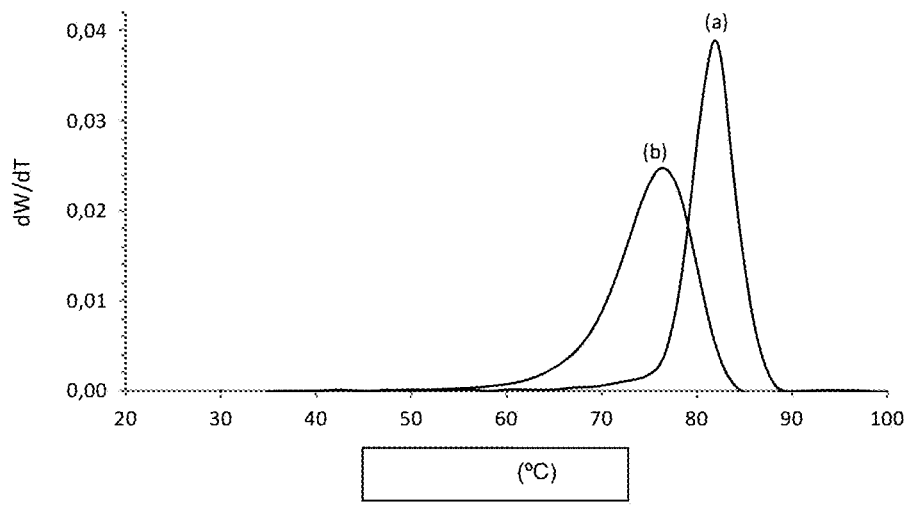

FIG. 6—Fractioned crystallization curve of linear low-density polyethylenes prepared with the catalysts from Examples 3 and 4 (Comparative).

DETAILED DESCRIPTION OF THE INVENTION

For an improved understanding, below are certain abbreviations and explanations on the terms mentioned in the present specification:

Soluble hybrid silica: silica containing organic groups linked by covalent bonding of the carbon-silica type. The presence of the organic groups makes the soluble silica in the solvent medium, provided that the polarity of the organic groups is similar to the polarity of the solvent.

TEOS: tetraethoxysilane.

Acid support: inorganic support containing Lewis and Brönsted acid sites on the surface.

Content of C: percentage by mass of carbon from the organic groups of the hybrid soluble silica in the catalyst, calculated by mass balance.

Content of transition metal: percentage by mass of transition metal of groups IV or V of the periodic table in the catalyst, calculated by mass balance.

Content of Al: percentage by mass of aluminum relative to the support, calculated by mass balance.

Al/M molar ratio: ratio between the number of mols of aluminum of the organometallic compound and the number of mols of the transition metal of groups 4 or 5 of the periodic table in the catalyst.

Catalytic activity: represents the yield in kilograms (kg) of polymer produced per gram (g) of catalyst.

FT-IR: Fourier transform infrared spectroscopy.

RMN of $^{29}$Si: nuclear magnetic resonance spectroscopy of $^{29}$Si.

SEM: scanning electron microscopy.

GPC: gel permeation chromatography.

Mw: weighted average molar mass.

Mz: z-average molar mass.

Mn: numerical average molar mass.

Crystaf: crystallization analysis fractionation with temperature gradient.

The present invention pertains to a metallocene catalyst based on a transition metal of groups 4 or 5 of the periodic table supported on a support modified with hybrid soluble silica, prepared by a non-hydrolytic sol-gel process.

The supported metallocene catalyst on a support modified with hybrid soluble silica of the present invention comprises:

(I) at least one metallocene derived from a compound of formula 1:

$$[L]_2\text{-}MQ_2 \qquad \text{formula 1}$$

wherein,

M is a transition metal of groups 4 or 5;

Q, which may be the same or different, comprises: halogen radical, aryl radical, alkyl radical containing from 1 to 5 carbon atoms or alkoxy radical containing from 1 to 5 carbon atoms; and L is a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by bonding.

Representative but non-limitative examples of compounds having formula 1 include: $Cp_2TiCl_2$, $Cp_2TZrCl_2$, $Cp_2HfCl_2$, $Cp_2VCl_2$, $Cp_2Ti(Me)_2$, $Cp_2Zr(Me)_2$, $Cp_2Hf(Me)_2$, $Cp_2Ti(OMe)_2$, $Cp_2Zr(OMe)_2$, $Cp_2Hf(OMe)_2$, $Cp_2Ti(OEt)_2$, $Cp_2Zr(OEt)_2$, $Cp_2Hf(OEt)_2$, $Ind_2TiCl_2$, $Ind_2ZrCl_2$, $Ind_2HfCl_2$, $Ind_2VCl_2$, $Ind_2Ti(Me)_2$, $Ind_2Zr(Me)_2$, $Ind_2Hf(Me)_2$, $Ind_2Ti(Me)_2$, $Ind_2Zr(OMe)_2$, $Ind_2Hf(OMe)_2$, $Ind_2Ti(OEt)_2$, $Ind_2Zr(OEt)_2$, $Ind_2Hf(OEt)_2$, $Flu_2TiCl_2$, $Flu_2ZrCl_2$, $Flu_2HfCl_2$, $Flu_2VCl_2$, $Flu_2Ti(Me)_2$, $Flu_2Zr(Me)_2$, $Flu_2Hf(Me)_2$, $Flu_2Ti(OMe)_2$, $Flu_2Zr(OMe)_2$, $Flu_2Hf(OMe)_2$, $Flu_2Ti(OEt)_2$, $Flu_2Zr(OEt)_2$, $Flu_2Hf(OEt)_2$, $(MeCp)_2TiCl_2$, $(MeCp)_2TZrCl_2$, $(MeCp)_2HfCl_2$, $(MeCp)_2VCl_2$, $(MeCp)_2Ti(Me)_2$, $(MeCp)_2Zr(Me)_2$, $(MeCp)_2Hf(Me)_2$, $(MeCp)_2Ti(OMe)_2$, $(MeCp)_2Zr(OMe)_2$, $(MeCp)_2Hf(OMe)_2$, $(MeCp)_2Ti(OEt)_2$, $(MeCp)_2Zr(OEt)_2$, $(MeCp)_2Hf(OEt)_2$, $(nBuCp)_2TiCl_2$, $(nBuCp)_2TZrCl_2$, $(nBuCp)_2HfCl_2$, $(nBuCp)_2VCl_2$, $(nBuCp)_2Ti(Me)_2$, $(nBuCp)_2Zr(Me)_2$, $(nBuCp)_2Hf(Me)_2$, $(nBuCp)_2Ti(OCH_3)_2$, $(nBuCp)_2Zr(OCH_3)_2$, $(nBuCp)_2Hf(OCH_3)_2$, $(nBuCp)_2Ti(OEt)_2$, $(nBuCp)_2Zr(OEt)_2$, $(nBuCp)_2Hf(OEt)_2$, $(Me_5Cp)_2TiCl_2$, $(Me_5Cp)_2TZrCl_2$, $(Me_5Cp)_2HfCl_2$, $(Me_5Cp)_2VCl_2$, $(Me_5Cp)_2Ti(Me)_2$, $(Me_5Cp)_2Zr(Me)_2$, $(Me_5Cp)_2Hf(Me)_2$, $(Me_5Cp)_2Ti(OMe)_2$, $(Me_5Cp)_2Zr(OMe)_2$, $(Me_5Cp)_2Hf(OMe)_2$, $(Me_5Cp)_2Ti(OEt)_2$, $(Me_5Cp)_2Zr(OEt)_2$, $(Me_5Cp)_2Hf(OEt)_2$, $(4,7\text{-}Me_2Ind)_2TiCl_2$, $(4,7\text{-}Me_2Ind)_2TZrCl_2$, $(4,7\text{-}Me_2Ind)_2HfCl_2$, $(4,7\text{-}Me_2Ind)_2VCl_2$, $(4,7\text{-}Me_2Ind)_2Ti(Me)_2$, $(4,7\text{-}Me_2Ind)_2Zr(Me)_2$, $(4,7\text{-}Me_2Ind)_2Hf(Me)_2$, $(4,7\text{-}Me_2Ind)_2Ti(OMe)_2$, $(4,7\text{-}Me_2Ind)_2Zr(OMe)_2$, $(4,7\text{-}Me_2Ind)_2Hf(OMe)_2$, $(4,7\text{-}Me_2Ind)_2Ti(OEt)_2$, $(4,7\text{-}Me_2Ind)_2Zr(OEt)_2$, $(4,7\text{-}Me_2Ind)_2Hf(OCH_2CH_3)_2$, $(2\text{-}MeInd)_2TiCl_2$, $(2\text{-}MeInd)_2TZrCl_2$, $(2\text{-}MeInd)_2HfCl_2$, $(2\text{-}MeInd)_2VCl_2$, $(2\text{-}MeInd)_2Ti(Me)_2$, $(2\text{-}MeInd)_2Zr(Me)_2$, $(2\text{-}MeInd)_2Hf(Me)_2$, $(2\text{-}MeInd)_2Ti(OMe)_2$, $(2\text{-}MeInd)_2Zr(OMe)_2$, $(2\text{-}MeInd)_2Hf(OMe)_2$, $(2\text{-}MeInd)_2Ti(OEt)_2$, $(2\text{-}MeInd)_2Zr(OEt)_2$, $(2\text{-}MeInd)_2Hf(OEt)_2$, $(2\text{-}arilInd)_2TiCl_2$, $(2\text{-}arilInd)_2TZrCl_2$, $(2\text{-}arilInd)_2HfCl_2$, $(2\text{-}arilInd)_2VCl_2$, $(2\text{-}arilInd)_2Ti(Me)_2$, $(2\text{-}arilInd)_2Zr(Me)_2$, $(2\text{-}arilInd)_2Hf(Me)_2$, $(2\text{-}arilInd)_2Ti(OMe)_2$, $(2\text{-}arilInd)_2Zr(OMe)_2$, $(2\text{-}arilInd)_2Hf(OMe)_2$, $(2\text{-}arilInd)_2Ti(OEt)_2$, $(2\text{-}arilInd)_2Zr(OEt)_2$, $(2\text{-}arilInd)_2Hf(OEt)_2$, $(4,5,6,7\text{-}H_4Ind)_2TiCl_2$, $(4,5,6,7\text{-}H_4Ind)_2ZrCl_2$, $(4,5,6,7\text{-}H_4Ind)_2HfCl_2$, $(4,5,6,7\text{-}H_4Ind)_2VCl_2$, $(4,5,6,7\text{-}H_4Ind)_2Ti(Me)_2$, $(4,5,6,7\text{-}H_4Ind)_2Zr(Me)_2$, $(4,5,6,7\text{-}H_4Ind)_2Hf(Me)_2$, $(4,5,6,7\text{-}H_4Ind)_2Ti(OMe)_2$, $(4,5,6,7\text{-}H_4Ind)_2Zr(OMe)_2$, $(4,5,6,7\text{-}H_4Ind)_2Hf(OMe)_2$, $(4,5,6,7\text{-}H_4Ind)_2Ti$ (OEt)$_2$, (4,5,6,7-H$_4$Ind)$_2$Zr(OEt)$_2$, (4,5,6,7-H$_4$Ind)$_2$Hf(OEt)$_2$, (9-MeFlu)$_2$TiCl$_2$, (9-MeFlu)$_2$TZrCl$_2$, (9-MeFlu)$_2$HfCl$_2$, (9-MeFlu)$_2$VCl$_2$, (9-MeFlu)$_2$Ti(Me)$_2$, (9-MeFlu)$_2$Zr(Me)$_2$, (9-MeFlu)$_2$Hf(Me)$_2$, (9-MeFlu)$_2$Ti(OMe)$_2$, (9-MeFlu)$_2$Zr(OMe)$_2$, (9-MeFlu)$_2$Hf(OMe)$_2$, (9-MeFlu)$_2$Ti(OEt)$_2$, (9-MeFlu)$_2$Zr(OEt)$_2$, (9-MeFlu)$_2$Hf(OEt)$_2$.

The content of transition metal of the metallocene complex defined in (I) in the catalyst of the present invention is in the range of 0.1 to 6%.

(II) a hybrid soluble silica, prepared by the non-hydrolytic sol-gel process;

A hybrid soluble silica present in the catalyst of the present invention has a structure consisting of siloxane groups (SiOSi), alkoxy groups and aliphatic organic groups. In this structure, the aliphatic organic groups are covalently bonded to the silicon atoms.

(III) an inorganic catalyst support;

The inorganic catalyst support of the catalyst of the present invention is a compound belonging to the group of oxides. Examples of supports used are selected from silica, alumina, magnesia, mixed oxides of silica-alumina, silica-magnesia, alumina-magnesia and silica-magnesium chloride, modified or not with electroceptor groups such as fluorine, chloride, phosphate and sulfate.

In the catalyst of the present invention, a hybrid soluble silica is physically or chemically adsorbed on the surface of the inorganic catalyst support. The content of C, from the aliphatic organic groups of the hybrid soluble silica, in the catalyst is comprised between 0.5% and 20% relative to the mass of inorganic support.

(IV) at least one aluminum-containing organometallic reagent.

The organometallic reagent containing aluminum is an aluminoxane compound of the metylaluminoxane (MAO) type, etylaluminoxane (EAO) or a compound of formula 2

Formula 2 wherein:
C is an aliphatic organic group containing 1 to 6 carbon atoms;
Al is the chemical element aluminum;
x is an integer which can range from 0 to 1;
y is an integer which can range from 2 to 3.

Examples of organometallic reagents containing aluminum of formula 2 present in the catalyst of the present invention are: trimethylaluminum, triethylaluminum, triisobutylaluminum, tri-n-hexylaluminum and diethylaluminum chloride. The catalyst of the present invention exhibits contents of Al, from the organometallic reagent, in the range of 1 to 20%.

Additionally, the present invention pertains to a process for obtaining supported metallocene catalysts based on a transition metal of groups 4 or 5, comprising:
a) Preparing a hybrid soluble silica;
b) Reacting the hybrid soluble silica obtained in step (a) with an inorganic support;
c) Removing the solvent from the reaction product obtained in step (b);
d) Reacting the product obtained in step (c) with an organometallic reagent containing aluminum;
e) Removing the solvent from the reaction product obtained in step (d);
f) Reacting the product obtained in step (e) with a metallocene complex;
g) Removing the solvent from the reaction product obtained in step (f).

In step (a) of the process for obtaining supported metallocene catalysts based on a transition metal of groups 4 or 5 of the present invention, a hybrid soluble silica is prepared.

A hybrid soluble silica of the present invention is obtained by a non-hydrolytic sol-gel route, where a metal halide acts as catalyst of the sol-gel reaction. This catalyst accelerates the condensation reactions of the reagents present in said reaction.

In a preferred embodiment, a hybrid soluble silica is prepared according to the following steps:
i) Preparing a suspension of a metal halide in an organic solvent;
ii) Adding silicon tetrachloride on the suspension prepared in (i);
iii) Preparing a mixture containing an alkoxysilane, an organo-alkoxysilane and an organic solvent;
iv) Adding the mixture prepared in (iii) on the suspension obtained in (ii);
v) Chemical reaction between the reagents present in the mixture prepared in (iv).

In step (i) of the process for preparing the hybrid soluble silica, a suspension of a metal halide in an organic solvent is prepared. The concentration of metal halide in this suspension should be in the range of 0.5 mg to 10 mg per mL of organic solvent.

Examples of metal halides that can be used in step (i) of the process for preparing the hybrid soluble silica are selected from the group that comprises iron chloride III, aluminum chloride, titanium chloride IV and zirconium chloride IV. Iron chloride III is preferably used.

Non-limitative examples of solvents that can be used for the suspension of the metal halide are selected from the group that comprises toluene, cyclo-hexane, n-hexane, n-heptane, n-octane and/or mixtures thereof.

In step (ii) of the process for preparing the hybrid soluble silica, silicon tetrachloride is added to the suspension prepared in (i). The molar ratio of silicon tetrachloride/metal halide is in the range between 10 and 100, preferably between 20 and 60.

In step (iii) of the process for preparing the hybrid soluble silica, a mixture is made containing an alkoxysilane, an organo-alkoxysilane and an organic solvent. The concentration of total silane (alkoxysilane+organo-alkoxysilane) in this mixture should be in the range of 0.1 mmol to 10 mmol per mL of organic solvent.

Non-limitative examples of the alkoxysilanes used in the present invention are selected from the group that comprises tetramethoxysilane, tetraethoxysilane, tetrapropoxysilane, tetrabutoxysilane. Tetraethoxysilane should preferably be used.

The organo-alkoxysilane has a carbon chain from 1 to 40 carbon atoms. An organo-alkoxysilane having 8 to 22 carbon atoms is preferably used.

The alkoxide grouping of said reagent should have from 1 to 4 carbon atoms. Alkoxide grouping having 1 carbon atom is preferably used.

Non-limitative examples of the organo-alkoxysilanes used in the present invention are selected from the group that comprises methyltriethoxysilane, propyltrimethoxysilane, octyltrimethoxysilane, hexadecyltrimethoxysilane and octadecyltrimethoxysilane.

Non-limitative examples of solvents used in step (iii) of the process for preparing the hybrid soluble silica are selected from the group that comprises toluene, cyclo-hexane, n-hexane, n-heptane, n-octane and/or mixtures thereof.

The molar ratio of organo-alkoxysilane/alkoxysilane in the mixture prepared in step (iii) may range from 0.05 to 20, preferably between 0.1 and 5.

In step (iv) of the process for preparing the hybrid soluble silica, the mixture prepared in (iii) is added to the suspension obtained in (ii);

The molar ratio total silane/silicon tetrachloride used in preparing the hybrid soluble silica may range from 1 to 10.

The temperature during the addition in step (iv) may range between the limits of 10 to 40° C.

In step (v) of the process for preparing the hybrid soluble silica, the chemical reaction occurs between the reagents present in the mixture prepared in (iv).

The temperature of the reaction of step (v) may range between 50 and 200° C., preferably between 80 and 150° C.

The reaction time of step (v) may range from 0.5 to 50 h, preferably from 5 to 25 h.

In step (b) of the process for obtaining supported metallocene catalysts based on a transition metal of groups 4 or 5 of the present invention, the hybrid soluble silica is reacted with an inorganic support. The inorganic support may be used in its form in natura or calcined up to a temperature limit of 800° C. The content of hybrid soluble silica added to the inorganic support may range from 0.5% to 20% by mass of carbon per mass of inorganic support.

Non-limitative examples of solvents that can be used in step (b) of the process for preparing of the catalyst of the present invention are selected from the group that comprises toluene, cyclo-hexane, n-hexane, n-heptane and/or mixtures thereof.

The temperature of the reaction of step (b) may range between 10 and 200° C., preferably between 20 and 50° C. The stirring velocity is kept between 50 and 500 rpm. The temperature in step (b) may range from 10 to 80° C., preferably between 20 and 40° C. The reaction of step (b) is kept for a time between 0.1 and 24 h.

In step (c) of the process for obtaining the metallocene catalysts of the present invention, the solvent is removed from the reaction product obtained in step (b) preferably by techniques of nitrogen gas flow evaporation, settling/siphoning, evaporation by reduced pressure or evaporation by heating, used in isolation or in combination.

In step (d), the product obtained in step (c) is reacted with one aluminum-containing organometallic reagent.

The content of organometallic reagent containing aluminum added to the product of step (c) may range from 0.1% to 20% by mass of aluminum per mass of product of step (c).

Examples of organometallic reagents used in step (d) are preferably selected from among metylaluminoxane, etylaluminoxane, trimethylaluminum, triethylaluminum, tri-isobutylaluminum, tri-n-hexilaluminum and diethylaluminum chloride.

Non-limitative examples of solvents that can be used in step (d) are preferably selected from among toluene, cyclohexane, n-hexane, n-heptane, n-octane and/or mixtures thereof.

The temperature of the reaction of step (d) may range between 0 and 40° C., preferably between 10 and 30° C.

The stirring velocity in step (d) of the process is kept between 0 and 500 rpm.

The reaction of step (d) is kept for a time between 0.1 and 8 h, specifically between 0.5 and 2 h.

In step (e) of the process for obtaining metallocene catalysts, the solvent is removed from the reaction product obtained in step (d) preferably by techniques of nitrogen gas flow evaporation, settling/siphoning, evaporation by reduced pressure or evaporation by heating, used in isolation or in combination.

In step (f) of the process for obtaining metallocene catalysts, the product obtained in step (e) is reacted with a metallocene complex.

The metallocene used in step (f) of the process comprises a derivative compound of the following formula:

$$[L]_2\text{-}MQ_2 \qquad \text{formula 1}$$

wherein,

M is a transition metal of groups 4 or 5;

Q, which may be the same or different, comprises: halogen radical, aryl radical, alkyl radical containing from 1 to 5 carbon atoms or alkoxy radical containing from 1 to 5 carbon atoms; and L is a bulky ligand of the cyclopentadienyl, indenyl or fluorenyl type, substituted or not by hydrogen, alkyl, cycloalkyl, aryl, alkenyl, alkylaryl, arylalkyl or arylalkenyl, linked to the transition metal by bonding.

Representative but non-limitative examples of compounds having formula 1 include: $Cp_2TiCl_2$, $Cp_2TZrCl_2$, $Cp_2HfCl_2$, $Cp_2VCl_2$, $Cp_2Ti(Me)_2$, $Cp_2Zr(Me)_2$, $Cp_2Hf(Me)_2$, $Cp_2Ti(OMe)_2$, $Cp_2Zr(OMe)_2$, $Cp_2Hf(OMe)_2$, $Cp_2Ti(OEt)_2$, $Cp_2Zr(OEt)_2$, $Cp_2Hf(OEt)_2$, $Ind_2TiCl_2$, $Ind_2ZrCl_2$, $Ind_2HfCl_2$, $Ind_2VCl_2$, $Ind_2Ti(Me)_2$, $Ind_2Zr(Me)_2$, $Ind_2Hf(Me)_2$, $Ind_2Ti(Me)_2$, $Ind_2Zr(OMe)_2$, $Ind_2Hf(OMe)_2$, $Ind_2Ti(OEt)_2$, $Ind_2Zr(OEt)_2$, $Ind_2Hf(OEt)_2$, $Flu_2TiCl_2$, $Flu_2TZrCl_2$, $Flu_2HfCl_2$, $Flu_2VCl_2$, $Flu_2Ti(Me)_2$, $Flu_2Zr(Me)_2$, $Flu_2Hf(Me)_2$, $Flu_2Ti(OMe)_2$, $Flu_2Zr(OMe)_2$, $Flu_2Hf(OMe)_2$, $Flu_2Ti(OEt)_2$, $Flu_2Zr(OEt)_2$, $Flu_2Hf(OEt)_2$, $(MeCp)_2TiCl_2$, $(MeCp)_2TZrCl_2$, $(MeCp)_2HfCl_2$, $(MeCp)_2VCl_2$, $(MeCp)_2Ti(Me)_2$, $(MeCp)_2Zr(Me)_2$, $(MeCp)_2Hf(Me)_2$, $(MeCp)_2Ti(OMe)_2$, $(MeCp)_2Zr(OMe)_2$, $(MeCp)_2Hf(OMe)_2$, $(MeCp)_2Ti(OEt)_2$, $(MeCp)_2Zr(OEt)_2$, $(MeCp)_2Hf(OEt)_2$, $(nBuCp)_2TiCl_2$, $(nBuCp)_2TZrCl_2$, $(nBuCp)_2HfCl_2$, $(nBuCp)_2VCl_2$, $(nBuCp)_2Ti(Me)_2$, $(nBuCp)_2Zr(Me)_2$, $(nBuCp)_2Hf(Me)_2$, $(nBuCp)_2Ti(OCH_3)_2$, $(nBuCp)_2Zr(OCH_3)_2$, $(nBuCp)_2Hf(OCH_3)_2$, $(nBuCp)_2Ti(OEt)_2$, $(nBuCp)_2Zr(OEt)_2$, $(nBuCp)_2Hf(OEt)_2$, $(Me_5Cp)_2TiCl_2$, $(Me_5Cp)_2ZrCl_2$, $(Me_5Cp)_2HfCl_2$, $(Me_5Cp)_2VCl_2$, $(Me_5Cp)_2Ti(Me)_2$, $(Me_5Cp)_2Zr(Me)_2$, $(Me_5Cp)_2Hf(Me)_2$, $(Me_5Cp)_2Ti(OMe)_2$, $(Me_5Cp)_2Zr(OMe)_2$, $(Me_5Cp)_2Hf(OMe)_2$, $(Me_5Cp)_2Ti(OEt)_2$, $(Me_5Cp)_2Zr(OEt)_2$, $(Me_5Cp)_2Hf(OEt)_2$, $(4,7\text{-}Me_2Ind)_2TiCl_2$, $(4,7\text{-}Me_2Ind)_2ZrCl_2$, $(4,7\text{-}Me_2Ind)_2HfCl_2$, $(4,7\text{-}Me_2Ind)_2VCl_2$, $(4,7\text{-}Me_2Ind)_2Ti(Me)_2$, $(4,7\text{-}Me_2Ind)_2Zr(Me)_2$, $(4,7\text{-}Me_2Ind)_2Hf(Me)_2$, $(4,7\text{-}Me_2Ind)_2Ti(OMe)_2$, $(4,7\text{-}Me_2Ind)_2Zr(OMe)_2$, $(4,7\text{-}Me_2Ind)_2Hf(OMe)_2$, $(4,7\text{-}Me_2Ind)_2Ti(OEt)_2$, $(4,7\text{-}Me_2Ind)_2Zr(OEt)_2$, $(4,7\text{-}Me_2Ind)_2Hf(OCH_2CH_3)_2$, $(2\text{-}MeInd)_2TiCl_2$, $(2\text{-}MeInd)_2ZrCl_2$, $(2\text{-}MeInd)_2HfCl_2$, $(2\text{-}MeInd)_2VCl_2$, $(2\text{-}MeInd)_2Ti(Me)_2$, $(2\text{-}MeInd)_2Zr(Me)_2$, $(2\text{-}MeInd)_2Hf(Me)_2$, $(2\text{-}MeInd)_2Ti(OMe)_2$, $(2\text{-}MeInd)_2Zr(OMe)_2$, $(2\text{-}MeInd)_2Hf(OMe)_2$, $(2\text{-}MeInd)_2Ti(OEt)_2$, $(2\text{-}MeInd)_2Zr(OEt)_2$, $(2\text{-}MeInd)_2Hf(OEt)_2$, $(2\text{-}arilInd)_2TiCl_2$, $(2\text{-}arilInd)_2ZrCl_2$, $(2\text{-}arilInd)_2HfCl_2$, $(2\text{-}arilInd)_2VCl_2$, $(2\text{-}arilInd)_2Ti(Me)_2$, $(2\text{-}arilInd)_2Zr(Me)_2$, $(2\text{-}arilInd)_2Hf(Me)_2$, $(2\text{-}arilInd)_2Ti(OMe)_2$, $(2\text{-}arilInd)_2Zr(OMe)_2$, $(2\text{-}arilInd)_2Hf(OMe)_2$, $(2\text{-}arilInd)_2Ti(OEt)_2$, $(2\text{-}arilInd)_2Zr(OEt)_2$, $(2\text{-}arilInd)_2Hf(OEt)_2$, $(4,5,6,7\text{-}H_4Ind)_2TiCl_2$, $(4,5,6,7\text{-}H_4Ind)_2ZrCl_2$, $(4,5,6,7\text{-}H_4Ind)_2HfCl_2$, $(4,5,6,7\text{-}H_4Ind)_2VCl_2$, $(4,5,6,7\text{-}H_4Ind)_2Ti(Me)_2$, $(4,5,6,7\text{-}H_4Ind)_2Zr(Me)_2$, $(4,5,6,7\text{-}H_4Ind)_2Hf(Me)_2$, $(4,5,6,7\text{-}H_4Ind)_2Ti(OMe)_2$, $(4,5,6,7\text{-}H_4Ind)_2Zr(OMe)_2$, $(4,5,6,7\text{-}H_4Ind)_2Hf(OMe)_2$, $(4,5,6,7\text{-}H_4Ind)_2Ti(OEt)_2$, $(4,5,6,7\text{-}H_4Ind)_2Zr(OEt)_2$, $(4,5,6,7\text{-}H_4Ind)_2Hf(OEt)_2$, $(9\text{-}MeFlu)_2TiCl_2$, $(9\text{-}MeFlu)_2ZrCl_2$, $(9\text{-}MeFlu)_2HfCl_2$, $(9\text{-}MeFlu)_2VCl_2$, $(9\text{-}MeFlu)_2Ti(Me)_2$, (9-Me- Flu)$_2$Zr(Me)$_2$, (9-MeFlu)$_2$Hf(Me)$_2$, (9-MeFlu)$_2$Ti(OMe)$_2$, (9-MeFlu)$_2$Zr(OMe)$_2$, (9-MeFlu)$_2$Hf(OMe)$_2$, (9-MeFlu)$_2$Ti(OEt)$_2$, (9-MeFlu)$_2$Zr(OEt)$_2$, (9-MeFlu)$_2$Hf(OEt)$_2$.

The content of metallocene added in step (f) of the process may range from 0.1 to 6% by mass of transition metal per mass of supported catalyst.

Non-limitative examples of solvents that can be used in step (f) of the process are selected from among toluene, cyclo-hexane, n-hexane, n-heptane, n-octane and/or mixtures thereof.

In a preferred embodiment, the metallocene complex can be reacted with an organometallic compound containing aluminum and subsequently added to the product obtained in step (e). The organometallic compounds that can be used are selected from among metylaluminoxane, etylaluminoxane, trimethylaluminum, triethylaluminum, tri-isobutylaluminum, tri-n-hexilaluminum and diethylaluminum chloride. The Al/M molar ratio that can be used is in the range of 2 to 100.

The temperature of the reaction of step (f) of the process may range between 10 and 80° C., preferably between 20 and 40° C.

The stirring velocity in step (f) of the process is kept between 0 and 500 rpm.

The reaction of step (f) of the process is kept for a time in the range of 0.1 to 8 h, specifically between 0.5 and 2 h.

In step (g) of the process for obtaining metallocene catalysts, the solvent is removed from the reaction product obtained in step (f) preferably by techniques of nitrogen gas flow evaporation, settling/siphoning, evaporation by reduced pressure or evaporation by heating, used in isolation or in combination.

The supported metallocene catalysts of the present invention are suitable for being used in a process of copolymerization of the ethylene with alpha-olefins in suspension or gas phase processes. The alpha-olefins are selected from among: propene, 1-butene, 1-octene and 1-decene.

The supported metallocene catalysts of the present invention exhibit catalytic activity of 0.4 to 12 kg pol/g cat.

During the process of copolymerization of the ethylene with alpha-olefins, besides the supported catalyst of the present invention, a cocatalyst alkylaluminum can be used, and the preferred forms are selected from among metylaluminoxane, trimethylaluminum, triethylaluminum, tri-isobutylaluminum.

The Al/M molar ratio in the process of copolymerization of ethylene with alpha-olefins is from 100 to 2000.

The copolymers of ethylene with α-olefins, obtained with the supported metallocene catalysts of the present invention, exhibit uniform distribution of incorporated comonomer and high molar mass value in the ultra-high molar mass fraction, combined characteristics that lead to the formation of a mechanically more resistant material, with improved optical and weldability properties.

For a better understanding of the invention and of the improvements obtained, below are some comparative and realization examples, which should not be considered as limitative on the ambit and scope of the invention.

In the examples of the present invention, iron chloride (Sigma-Aldrich, 99% purity), silicon tetrachloride (Merck, 99% purity), tetraethoxysilane (Merck, 98% purity), octadecyltrimethoxysilane (Sigma-Aldrich, 90% purity), trimethylaluminum (Akzo Nobel, 9.0% in Al in hexane), triethylaluminum (Akzo Nobel, 9.0% in Al in hexane), tri-isobutylaluminum (Akzo Nobel, 9.0% in Al in hexane) and metylaluminoxane (Sigma-Aldrich, 13% in Al in toluene), (n-BuCp)$_2$ZrCl$_2$ (Boulder, 98% purity), silica Sylopol 948 (Grace) are used without prior purification.

The hexane (Merck, 95% purity), the octane (Sigma-Aldrich, 98%) and the 1-hexene, used in the preparation of the supported metallocene catalyst and in the copolymerization of the ethylene with alpha-olefins, are dried according to conventional techniques.

All the manipulation carried out using inert nitrogen atmosphere with a maximum limit of 1.5 ppm of humidity.

Example 1: Preparing the Hybrid Soluble Silica 100 mg of iron chloride were suspended in 20 mL of octane. Two (2) mL (18 mmol) of silicon tetrachloride was added to this suspension. A mixture containing 10 mL tetraethyl orthosilicate, or TEOS (45 mmol) and 4.2 mL of octadecylsilane, or ODS (9.0 mmol) in 20 mL of octane was prepared separately. This mixture was added to the suspension of silicon tetrachloride and iron chloride in octane, under magnetic stirring and temperature of 25° C. After the addition, the recipient was sealed and the reaction mixture was kept under magnetic stirring at 120° C. for a period of 8 h. The FT-IR spectrum of the hybrid soluble silica prepared under the conditions of Example 1 (FIG. 1) exhibits a centered band at 1080 cm$^{-1}$, which can be attributed to the asymmetrical stretching v$_{as}$(Si—O) of the groups Si—O—Si. This result proves the formation of the soluble silica.

The RMN spectrum of $^{29}$Si of the hybrid soluble silica, prepared under the conditions of Example 1 (FIG. 2), exhibits two centered peaks at −58 and −64 ppm, which may be attributed, respectively, to the silicon types T$^2$ and T$^3$. This result proves the link of the octadecylsilane groups in the silica structure.

Example 2: Preparing the Support Modified 12 g of silica Sylopol 948 activated at 600° C. were suspended in 83 mL of octane. To this suspension, there was added 17 mL of the solution of hybrid soluble silica (0.6 g of C$_{C18}$) under mechanical stirring at 200 rpm and temperature of 25° C. The suspension was left under mechanical stirring of 200 rpm at a temperature of 25° C. for 2 h. After this period, the product was dried under vacuum for 12 h.

The FTIR spectrum of the support modified of Example 2 (FIG. 3) exhibits a centered band at, approximately, 2930 cm$^{-1}$, which can be attributed to asymmetrical stretching v$_{as}$(CH$_2$) of the octadecylsilane groups. This result proves the recoating of the surface of the support by the hybrid soluble silica. The elementary analysis by CHN showed a content of carbon of 4.7% on this support modified, from the aliphatic organic groups of the hybrid soluble silica.

FIG. 4 exhibits the SEM images for the support modified and for the support in natura. According to FIG. 4, the support modified exhibited the same morphology as the start commercial support.

Example 3: Preparing the Supported Catalyst

Five (5) g of the support modified were suspended in 50 mL of hexane. To this suspension, there was added, drop by drop, 50 mL of a solution containing 5.2 mL of solution in metylaluminoxane (MAO) (13% in Al) in 45 mL of hexane (25 mmol in Al), under mechanical stirring of 200 rpm and temperature of 25° C. This suspension was kept under mechanical stirring of 200 rpm and at a temperature of 25° C. for 1 h. After this period, the solvent was removed by evaporation with nitrogen flow. The resulting solid was then suspended in 50 mL of hexane. A catalytic solution was prepared separately by reacting 50 mg of n-BuCp$_2$TZrCl$_2$ (0.25 mmol) with 9.0 mL of solution of TMA 9.0% (5.0 mmol) in 50 mL of hexane. This solution was added to the suspension containing the support impregnated with MAO under stirring of 200 rpm and temperature of 25° C. After mechanical stirring for 1 h, the solvent was removed by evaporation with nitrogen flow.

The content of Zr in the supported catalyst metallocene of Example 3 is 0.15% (p/p).

Example 4: Preparing the Supported Catalyst (Comparative)

Five (5) g of silica Sylopol 948 activated at 600° C. were suspended in 50 mL of hexane. To this suspension, under mechanical stirring of 200 rpm and temperature of 25° C., there was added, drop by drop, 50 mL of a solution containing 5.2 mL of solution of MAO (13% in Al) in 45 mL of hexane (25 mmol in Al). This suspension was kept under mechanical stirring of 200 rpm and at a temperature of 25° C. for 1 h. After this period, the solvent was removed by evaporation with nitrogen flow. The resulting solid when then suspended in 50 mL of hexane. A catalytic solution was prepared separately by reacting 50 mg of n-BuCp$_2$TZrCl$_2$ (0.25 mmol) with 9.0 mL of solution of TMA 9.0% (5.0 mmol) in 50 mL of hexane. This solution was added to the suspension containing the support impregnated with MAO under stirring of 200 rpm and a temperature of 25° C. After mechanical stirring for 1 h, the solvent was removed by evaporation with nitrogen flow.

The content of Zr in the supported catalyst metallocene of the comparative example is 0.16% (p/p).

Example 5: Polymerizations

In a steel reactor with 300 mL of capacity, and with mechanical stirring, 200 mL of hexane was added in a nitrogen atmosphere. The temperature is adjusted to 60° C. with the assistance of a thermostatically-controlled bath. A quantity of 100 µL of TEA is added for washing the reactor. The wash time is at least thirty minutes and the wash temperature is 80° C. The wash liquid is removed from the reactor by siphoning. After the wash, the reactor receives 200 mL of hexane, TIBA, supported catalyst and 10 mL of 1-hexene. The concentration of Zr is 3×10$^{-5}$ mol/L and the ratio Al/Zr (external) of 292. The ethylene pressure is adjusted to 8.0 bar and the polymerization is carried out for 1 h.

The polymers obtained with the catalyst of the present invention and with the catalyst of the comparative example were characterized by gel permeation chromatography (GPC) and fractionation by crystallization temperature (Crystaf), exhibiting the following characteristics:

TABLE 1

Data of molar mass and distribution of molar mass of the polymer produced with the catalyst of the present invention and with the catalyst of the comparative example.

| Catalyst | Mw | Mz | Mn | Mw/Mn |
|---|---|---|---|---|
| Example 4 (comparative) | 135 | 280 | 65 | 2.1 |
| Example 3 | 187 | 460 | 81 | 2.3 |

Table 1 shows the displacement of the curve profile to high molar masses, but a narrow distribution of the molar mass being maintained. The increase of the molar mass is more significant in the ultra-high molar mass fraction (Mz). FIG. 5 shows this displacement of the curve (b) to the right more evidently.

This molecular behavior will likely bring benefits in mechanical properties, with resistance to tear, piercing and impact. Maintaining the narrow distribution of molar mass may keep the level of oligomers or amorphs low in the soluble fraction, contributing to a low blockage level.

FIG. 6 shows the Crystaf profile for the example of this patent and the comparative polymer. The curve also showed an important displacement to lower crystallization temperatures. This means that the material has a differentiated comonomer distribution, taking it to a better level of product. The short ramifications (comonomer) were much better distributed along the chains, leading to a lower temperature of crystallinity, that is, a greater number of faults in the ethane sequence. Therefore, the formation of the crystalline structure is hindered, leading to the formation of smaller and finer crystals, and, therefore, having lower crystallization temperature.

The Crystaf revealed the trend of a material to crystallize with the reduction of the temperature in solution. The polymer produced with the catalyst of the present invention has more homogenous distribution than the polymer obtained with the comparative system.

Accordingly, it is possible to obtain polymers with greater molar mass (Mw and Mz), narrow distribution of molar mass (~2) and more homogenous comonomer distribution. These combined characteristics lead to the formation of a mechanically more resistant material, with improved optical and weldability properties.

Having described examples of preferred embodiments, it should be understood that the scope of the present invention encompasses other possible variations, being limited only by the content of the accompanying claims, potential equivalents included therein.

What is claimed is:

1. A metallocene catalyst based on a transition metal of groups 4 or 5 of the periodic table immobilized on a support modified with soluble hybrid silica, comprising:
   (a) at least one metallocene derived from a compound of formula 1:

[L]$_2$-MQ$_2$                                        formula 1 wherein
   M is a transition metal of groups 4 or 5;
   Q's, which are the same or different, are halogen radical, aryl radical, alkyl radical containing from 1 to 5 carbon atoms or alkoxy radical containing from 1 to 5 carbon atoms; and
   L is a bulky ligand of the cyclopentadienyl, indenyl or fluorenyl type, optionally substituted by alkyl, cycloalkyl, aryl, alkenyl, alkylaryl, arylalkyl or arylalkenyl, linked to the transition metal by bonding:
   (b) a hybrid soluble silica;
   (c) an inorganic catalyst support; and
   (d) at least one aluminum-containing organometallic reagent.

2. The catalyst according to claim 1, wherein the hybrid soluble silica is obtained by the non-hydrolytic sol-gel route and has a structure consisting of siloxane groups (SiOSi), alkoxy groups and aliphatic organic groups, covalently bonded to the silicon atoms.

3. The catalyst according to claim 1, wherein the inorganic catalyst support is an oxide compound.

4. The catalyst according to claim 1, wherein the organometallic reagent containing aluminum is an aluminoxane compound selected from methylaluminoxane type (MAO), etylaluminoxane (EAO) or a compound of formula 2

$$Cl_xAl(C)_y \qquad \text{Formula 2}$$

wherein:
C is an aliphatic organic group containing 1 to 6 carbon atoms;
Al is aluminum;
x is an integer from 0 to 1; and
y is an integer from 2 to 3.

5. The catalyst according to claim 1, wherein the hybrid soluble silica is physically adsorbed or chemically bonded on the surface of the inorganic catalyst support.

6. The catalyst according to claim 1, wherein the content of C, from the aliphatic organic groups of the hybrid soluble silica, in the catalyst is between 0.5% to 20% relative to the mass of inorganic support.

7. The catalyst according to claim 1, wherein the content of Al, from the organometallic reagent, ranges from 1 to 20% relative to the catalyst mass.

8. The catalyst according to claim 1, wherein the content of transition metal, from the metallocene complex of formula 1, ranges from 0.1 to 6% relative to the catalyst mass.

9. A process for obtaining a supported metallocene catalyst as defined in claim 1, comprising the following steps:
(a) Preparing a hybrid soluble silica;
(b) Reacting the hybrid soluble silica obtained in step (a) with an inorganic support;
(c) Removing the solvent from the reaction product obtained in step (b);
(d) Reacting the product obtained in step (c) with an organometallic reagent containing aluminum;
(e) Removing the solvent from the reaction product obtained in step (d);
(f) Reacting the product obtained in step (e) with a metallocene complex; and
(g) Removing the solvent from the reaction product obtained in step (f).

10. The process according to claim 9, wherein step (a) comprises the following steps:
i) Preparing a suspension of a metal halide in an organic solvent;
ii) Adding silicon tetrachloride on the suspension prepared in step (i);
iii) Preparing a mixture containing an alkoxysilane, an organo-alkoxysilane and an organic solvent;
iv) Adding the mixture prepared in step (iii) on the suspension obtained in step (ii); and
v) Chemical reaction between the reagents present in the mixture prepared in step (iv).

11. The process according to claim 9, wherein in step (b) the inorganic support can be used in its form in natura or calcined up to a temperature limit of 800° C.

12. The process according to claim 9, wherein the hybrid soluble silica added to the inorganic support in step (b) ranges from 0.5% to 20% by mass of carbon per mass of inorganic support.

13. The process according to claim 9, wherein the solvent is removed from the product of step (b) by a technique selected from nitrogen gas flow evaporation, settling/siphoning, evaporation by reduced pressure or evaporation by heating, used in isolation or in combination.

14. The process according to claim 9, wherein the organometallic reagent containing aluminum added in step (d) is an aluminoxane compound of the methylaluminoxane type, ethylaluminoxane or a compound of formula 2

$$Cl_xAl(C)_y \qquad \text{formula 2}$$

wherein:
C is an aliphatic organic group containing 1 to 6 carbon atoms;
Al is aluminum;
x is an integer from 0 to 1; and
y is an integer from 2 to 3.

15. The process according to claim 9, wherein the content of organometallic reagent containing aluminum added to the product of step (c) ranges from 0.1% to 20% by mass of aluminum per mass of product of step (c).

16. The process according to claim 9, wherein the solvent is removed from the reaction product obtained in step (d) by a technique selected from nitrogen gas flow evaporation, settling/siphoning, evaporation by reduced pressure or evaporation by heating, used in isolation or in combination.

17. The process according to claim 9, wherein the metallocene used in step (f) comprises a derivative compound of the following formula:

$$[L]_2\text{-}MQ_2 \qquad \text{formula 1}$$

wherein
M is a transition metal of groups 4 or 5;
Q's, which are the same or different, are halogen radical, aryl radical, alkyl radical containing from 1 to 5 carbon atoms or alkoxy radical containing from 1 to 5 carbon atoms; and
L is a bulky ligand of the cyclopentadienyl, indenyl or fluorenyl type, optionally substituted by alkyl, cycloalkyl, aryl, alkenyl, alkylaryl, arylalkyl or arylalkenyl, linked to the transition metal by bonding.

18. The process according to claim 9, wherein the content of metallocene added in step (f) ranges from 0.1 to 6% by mass of transition metal per mass of supported catalyst.

19. The process according to claim 9, wherein the solvent is removed from the reaction product obtained in step (f) by a technique selected from nitrogen gas flow evaporation, settling/siphoning, evaporation by reduced pressure or evaporation by heating, used in isolation or in combination.

20. A process of copolymerization of ethylene and an alpha-olefin in the presence of the supported metallocene catalyst according to claim 1.

* * * * *